United States Patent [19]

Siligoni et al.

[11] Patent Number: 4,782,507
[45] Date of Patent: Nov. 1, 1988

[54] MONOLITHICALLY INTEGRATABLE CIRCUIT FOR MEASURING LONGITUDINAL AND TRANSVERSE CURRENTS IN A TWO-WIRE TRANSMISSION LINE

[75] Inventors: Marco Siligoni, Vittuone; Ferdinando Lari, Bozzolo, both of Italy

[73] Assignee: SGS Microelettronica SPA, Milan, Italy

[21] Appl. No.: 841,789

[22] Filed: Mar. 20, 1986

[30] Foreign Application Priority Data

Mar. 20, 1985 [IT] Italy .............................. 19983 A/85

[51] Int. Cl.$^4$ .......................... G05F 3/16; H04M 19/00
[52] U.S. Cl. ...................................... 379/27; 379/399; 379/413; 323/315
[58] Field of Search ................ 323/315, 316; 379/345, 379/405, 413, 410, 399, 398, 27, 324, 395, 338; 340/347 DA, 347 AD, 425

[56] References Cited

U.S. PATENT DOCUMENTS

| | | | |
|---|---|---|---|
| 3,290,671 | 12/1966 | Lamoureux | 340/347 DA |
| 4,203,012 | 5/1980 | Boxall | 379/405 |
| 4,300,023 | 11/1981 | Kelley et al. | 379/405 |
| 4,314,196 | 2/1982 | Brown | 323/315 |
| 4,408,190 | 10/1983 | Nagano | 340/347 DA |
| 4,414,434 | 11/1983 | Ferrieu et al. | 379/410 |
| 4,431,874 | 2/1984 | Zobel et al. | 379/345 X |

FOREIGN PATENT DOCUMENTS

0054160  5/1981 Japan ................................ 379/399
2024564  1/1980 United Kingdom ................ 379/405

Primary Examiner—Jin F. Ng
Assistant Examiner—Randall S. Vaas
Attorney, Agent, or Firm—Wenderoth, Lind & Ponack

[57] ABSTRACT

A circuit, which may be monolithically integrated, for measuring longitudinal and transverse currents in a two-wire transmission line, includes first and second current mirror circuits of a first type, each having an input branch and first and second output branches. The measuring circuit also includes third, fourth and fifth current mirror circuits, each having an input branch and an output branch, and first and second currents mirror circuits of a second type, each having first and second input branches and first and second output branches. The input branches of the first and second current mirror circuits of the first type and the first input branches of the first and second current mirror circuits of the second type are used as input terminals for coupling to the line. The first and second current mirror circuits of the first type are both connected to the third current mirror circuit and are respectively connected to the first and second current mirror circuits of the second type, which are both connected to the fourth current mirror circuit. The second current mirror circuit of the second type is connected to the fifth current mirror circuit whose output the first output of the first current mirror circuit of the second type are connected together to form a first output terminal. The output of the third and the fourth current mirror circuits are connected together to form a second output terminal.

2 Claims, 2 Drawing Sheets

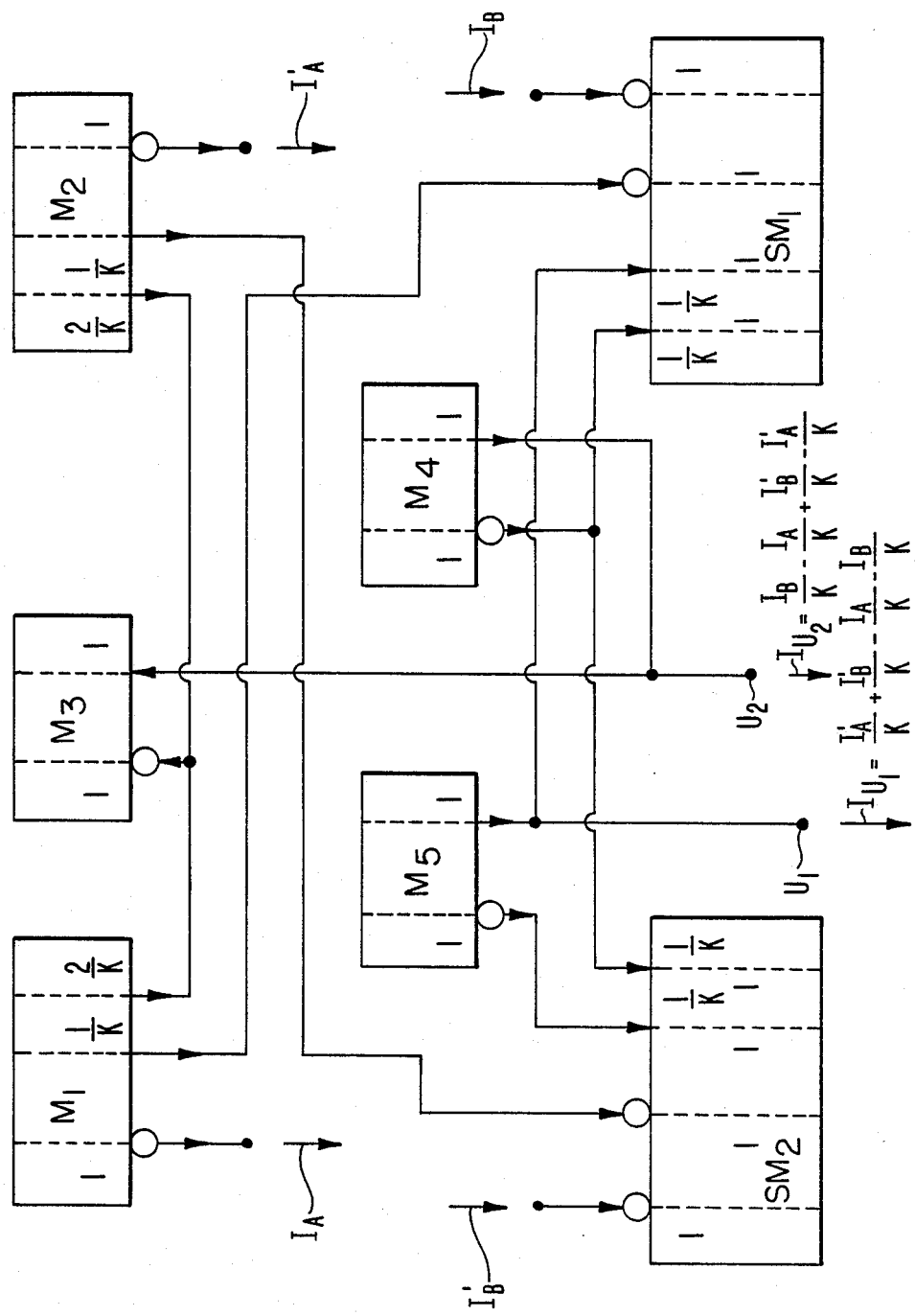

MONOLITHICALLY INTEGRATABLE CIRCUIT FOR MEASURING LONGITUDINAL AND TRANSVERSE CURRENTS IN A TWO-WIRE TRANSMISSION LINE

BACKGROUND OF THE INVENTION

The present invention relates to a circuit which may be monolithically integrated for measuring longitudinal and transverse currents in a two-wire transmission line and may be used, in particular, in electronic telephone interface circuits between a subscriber's telephone line and exchange control components.

As shown in the technical literature dealing with telephone interface circuits of this type, known also by the abbreviation SLIC (Subscriber Line Interface Circuit), the transfer of functions previously carried out by devices incorporated in individual subscribers' sets to electronic circuits at the exchange, has made accurate measurement of the line currents at the time of connection of the subscriber's line indispensable.

The problems entailed in accurately detecting the directions and intensities of longitudinal and transverse line currents so that appropriate regulation circuit means may be supplied with this information via measurement signals, have arisen, in particular, from the need to synthesize impedances, using electronic circuit means exclusively, so as to enable automatic line tuning in all operating and network conditions and from the need to be able to detect, with absolute certainty, the working signals transmitted in the line such as, for example, the lifting or replacement of a subscriber's telephone receiver, at the exchange.

As known to persons skilled in the art, an electronic interface circuit between a subscriber's telephone line and exchange control components in general comprises a circuit structure of the bridge type formed by two output amplifier components between which the subscriber's telephone line, and all the apparatus connected thereto, is inserted as a load.

These amplifier components drive the line in phase opposition when signals are present.

The "transverse" line current $I_L$ is the sum of the direct current supplying the line and the signal current which is generally of an alternating type. This transverse current $I_L$ is of identical intensity in the two wires of the line, but has opposite directions of flow.

However, if electrical lines having a 50 Hz alternating current or frequencies of an industrial type, or other telephone lines in which high intensity signals, such as ringing signals, are being transmitted, are in the vicinity of a two-wire telephone line, or more generally a two-wire transmission line, they may induce "longitudinal" or "common mode" currents $I_{CM}$ in both wires of this line, these currents having identical intensities and directions of flow in both wires of the line.

These common mode currents $I_{CM}$ which may, in the cases discussed above, be of an alternating type, do not, in general, have a waveshape which is fixed over time, therefor when they are superimposed on the transverse line current $I_L$, they alter its value in an unpredictable way.

If the overall resultant currents in the wire of the line with the higher potential and the wire of the line with the lower potential are designated conventionally by $I_A$ and $I_B$ respectively, the following may be expressed:

$$I_A = I_L + I_{CM}$$

$$I_B = I_L - I_{CM}$$

in which the actual directions of each current obviously have to be borne in mind in accordance with known electrotechnical conventions.

This shows that it is sufficient, in theory, to add and subtract the total currents $I_A$ and $I_B$ for an immediate "measurement" of the transverse line current $I_L$ and the longitudinal common mode currents $I_{CM}$ respectively. This gives:

$$|I_A + I_B| = 2|I_L|$$

$$|I_A - I_B| = 2|I_{CM}|$$

It is particularly necessary to obtain a measurement of the common mode currents $I_{CM}$ in cases in which these currents are intentionally induced in the line so that specific functions may be carried out, as takes place, for example, in private exchanges to enable the transfer of incoming calls from one subscriber's set directly to another by means of the appropriate key on the set itself.

In reality, a circuit capable of carrying out these simple operations in all longitudinal and transverse current conditions is comparatively complex with the result that it is expensive, if monolithically integrated, both from the point of view of integration area occupation and design problems.

In the adding and subtracting operations on the overall currents in the line are to give representative measurement results under all operating conditions, it is necessary, in the first instance, to take into account the possibility of inversions of the line polarity, since it is this polarity which determines the direction of flow of the transverse current $I_L$ in the line.

In addition, the possibility, particularly in very long transmission lines, in which the transverse line current $I_L$ is obviously reduced, while the probability of longitudinally induced currents is higher, of the intensity of the longitudinal common mode currents $I_{CM}$ being greater than the intensity of the transverse line current $I_L$, should not be neglected.

In this case, the overall currents in the line $I_A$ and $I_B$ have the same direction which is not determined by the line polarity, but is variable over time in a uniform manner with the direction of the common mode currents induced.

Since the active electronic components conduct essentially in a monodirectional manner during normal polarization and operating conditions, a circuit which may be monolithically integrated for measuring longitudinal and transverse line currents must be designed in such a way that it has an overall configuration which is compatible with input currents having any direction.

SUMMARY OF THE INVENTION

The object of this invention is to provide a new and improved circuit for measuring longitudinal and transverse currents in a two-wire transmission line, designed to be incorporated in a telephone interface circuit, which may be monolithically integrated, between a subscriber's telephone line and exchange control components.

The above-noted object may be effected by providing a monolithically integratable measuring circuit for measuring longitudinal and transverse currents in a two-wire transmission line comprising: first and second current mirror circuits of a first type each having at least one input branch and at least a first and a second output branch; third, fourth and fifth current mirror circuits each having at least one input branch and at least one output branch; and first and second current mirror circuits of a second type each having at least a first and a second input branch and at least a first and a second output branch; wherein: said input branch of said first current mirror circuit of the first type and said first input branch of said second current mirror circuit of the second type respectively form a first and a second input terminal of the measuring circuit for coupling to a first wire of the two-wire transmission line; said input branch of sad second current mirror circuit of the first type and said first input branch of said first current mirror circuit of the second type respectively form a third and a fourth input terminal of the measuring circuit for coupling to a second wire of the two-wire transmission line; said first and third terminals forming input terminals for currents having a first direction and said second and fourth terminals forming input terminals for currents having a second direction which is opposite to that of the first direction; the currents flowing in said first and second output branches in each of said first and second current mirror circuits of the first type being proportional to the current flowing in their respective input branch in accordance with a first and a second constant factor of proportionality respectively, the second constant factor of proportionality having a value which is double the value of the first constant factor; and wherein the current flowing in said output branch in each of said third, fourth and fifth current mirror circuits is identical to the current flowing in their respective input branch; and wherein the currents flowing in said first and second output branches of each of said first and second current mirror circuits of the second type are equal to the sum of a current equal to the current flowing in their respective second input branch and a current proportional to the current flowing in their respective first input branch in accordance with a constant factor of proportionality identical to the first constant factor; and wherein said first output branch of said first current mirror circuit of the first type and said first output branch of said second current mirror circuit of said first type are respectively connected to said second input branch of said first current mirror circuit of said second type and said second input branch of said second current mirror circuit of said second type and said second output branch of said first current mirror circuit said first type and said second output branch of said second current mirror circuit of said first type are both connected to said input branch of said third current mirror circuit; and wherein said second output branch of said first current mirror circuit of said second type and said second output branch of said second current mirror circuit of said second type are both connected to said input branch of said fourth current mirror circuit and said first output branch of said second current mirror circuit of said second type is connected to said input branch of said fifth current mirror circuit; and wherein said first output branch of said first current mirror circuit of said second type and said output branch of said fifth current mirror circuit are connected together to form a first output terminal of the measuring circuit and said output branch of said third current mirror circuit and said output branch of said fourth current mirror circuit are connected together to form a second output terminal of the measuring circuit.

BRIEF DESCRIPTION OF THE DRAWINGS

The invention is described in detail below, purely by way of non-limiting example, with reference to the attached drawings, in which:

FIG. 1 is a block diagram of a circuit in accordance with the present invention, which may be monolithically integrated, for measuring currents in a two-wire transmission line.

DESCRIPTION OF THE PREFERRED EMBODIMENT

The measurement circuit shown in FIG. 1, comprises a first current mirror circuit $M_1$ and a second current mirror circuit $M_2$, each having an input branch and first and second output branches, and third, fourth and fifth current mirror circuits $M_3$–$M_5$, each having an input branch and an output branch.

The circuit shown in FIG. 1 also comprises a first current mirror circuit $SM_1$ and a second current mirror circuit $SM_2$, each having a first and a second input branch and a first and second output branch.

The current mirror circuits mentioned above are each shown by a rectangular block in which the input and output branches are shown symbolically by dashed lines. Inputs are shown by circles.

Figure 2A:
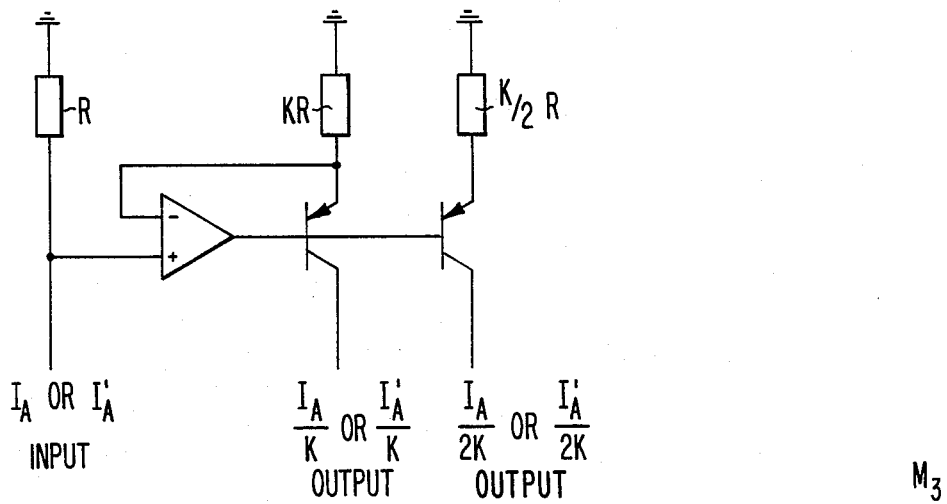
FIGS. 2(a), 2(b), 2(c), and 2(d) are simplified diagrams of the current mirrors of FIG. 1.
Figure 2B:
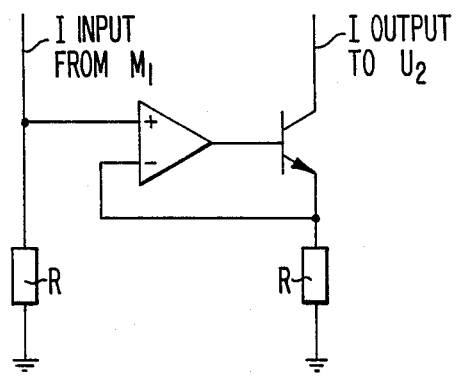
Figure 2C:
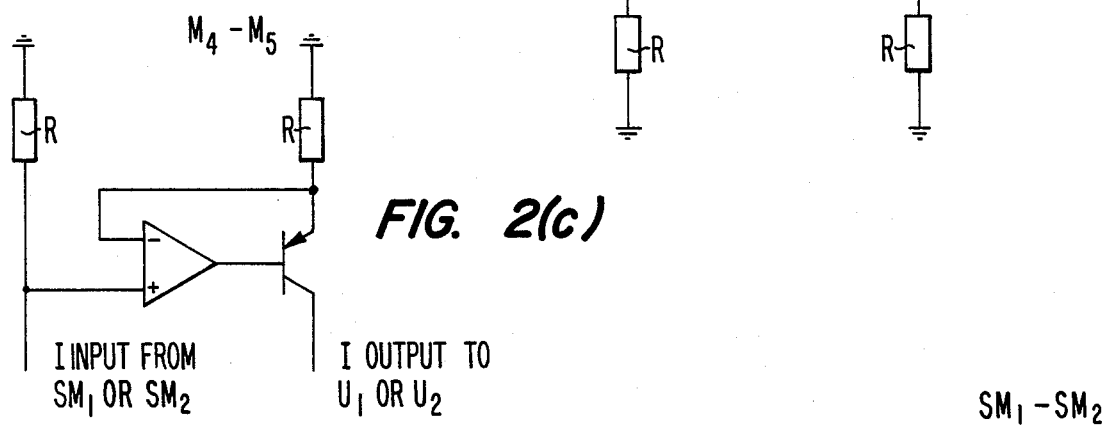
Figure 2D:
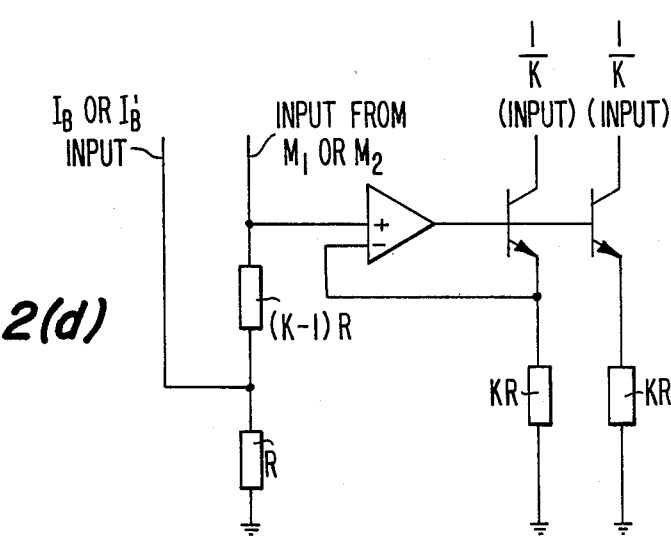

They may be constructed using methods known to persons skilled in the art. FIGS. 2(a)–(d) illustrate examples of circuits which may be used for the current mirrors of FIG. 1 and a detailed description thereof has been omitted for the sake of brevity.

Each of the blocks representing the circuits $M_1$, $M_2$, $M_3$, $M_4$, $M_5$, and $SM_1$, $SM_2$ shows, adjacent to each output branch, the value of the current flowing therein, expressed by means of a predetermined constant coefficient K whose value is greater than or equal to one, in relation to a unit current value in the input branch or a unit current value in each of the input branches.

Both in the first and second current mirror circuits $M_1$ and $M_2$, the currents flowing in the first and second output branches are proportional to the current flowing in their respective input branch in accordance with a constant factor of proportionality 1/K and a constant factor of proportionality 2/K respectively.

As shown in FIG. 1, the current flowing in the output branches of the third, fourth and fifth current mirror circuits $M_3$, $M_4$, and $M_5$ is identical to the current flowing in the input branches of these circuits.

However, in the first $SM_1$ and second $SM_2$ current mirror circuits, the currents flowing in the first and second output branches of these circuits are both equal to the sum of a current equivalent to the current flowing in the second input branch and the current proportional to the current flowing in the first input branch in accordance with a constant factor or proportionality 1/K.

As known, current amplifications are not carried out, but only those attenuations required to reduce the total absorption of supply current required by the measurement circuit so that it can process the input currents, thereby supplying output currents having a reduced intensity with respect to the intensity of the input currents, when K is greater than 1.

The input branch of the first current mirror circuit $M_I$, and the first input branch of the second current mirror circuit $SM_2$ respectively form a first and a second input terminal for coupling to a first wire of a two-wire transmission line (not shown).

The input branch of the second current mirror circuit $M_2$, and the first input branch of the first current mirror circuits $SM_1$ respectively form a third and a fourth input terminal for coupling to the second wire of the same transmission line.

The first and the third terminals are input terminals for currents having, in accordance with the known electrotechnical conventions, a first direction of input into the circuit. The second and the fourth terminals are input terminals for currents having a second direction of input into the circuit which is opposite to that of the first direction.

The first output branch of the first current mirror circuit $M_1$, and the first output branch of the second current mirror circuit $M_2$, are respectively connected to the second input branch of the first current mirror circuit $SM_1$ and the second input branch of the second current mirror circuit $SM_2$.

The second output branch of the first current mirror circuit $M_1$, and the second output branch of the second current mirror circuit $M_2$, are both connected to the input branch of the third current mirror circuit $M_3$.

The second output branch of the first current mirror circuit $SM_1$, and the second output branch of the second current mirror circuit $SM_2$, are both connected to the input branch of the fourth current mirror circuit $M_4$.

The first output branch of the second current mirror circuit $SM_2$ is connected to the input branch of the fifth current mirror circuit $M_5$.

The first output branch of the first current mirror circuit $SM_1$, and the output branch of the fifth current mirror circuit $M_5$, are connected together to form a first output terminal $U_1$.

The output branch of the third current mirror circuit $M_3$, and the output branch of the fourth current mirror circuit $M_4$, are connected together to form a second output terminal $U_2$.

The operation of a measurement circuit of the invention, the block diagram of which is shown in FIG. 1, will now be examined independently of its possible coupling to a two-wire transmission line.

Assume that the input branches of the current mirror circuits $M_1$ and $M_2$ are respectively supplied with a current $I_A$ and a current $I'_A$ both having an output direction with respect to the circuit, as shown in FIG. 1. A current $I_B$ and a current $I'B$, both having an input direction with respect to the circuit are then supplied to the first input branch of the current mirror circuit $SM_1$ and the first input branch of the second current mirror circuit $SM_2$ respectively. The direction of the current flowing in the branches is shown symbolically in each branch of the various circuits in FIG. 1.

A current $I_A/K$ and a current $2I_A/K$ are respectively produced as outputs in the first and second output branches of the current mirror circuit $M_1$.

Similarly, a current $I'_A/K$ and a current $2I'_A/K$ are respectively produced as outputs in the first and second output branches of the current mirror circuit $M_2$.

Consequently, a current $2I_A/K+2I'_A/K$, equal to the current flowing into its input branch is produced in the output branch of the current mirror circuit $M_3$.

A current $I_A/K+I_B/K$ is produced in each of the output branches of the current mirror circuit $SM_1$ as a result of the currents $I_A/K$ and $I_B$.

Similarly, a current $I'_A/K+I'_B/K$ is produced in each of the output branches of the current mirror circuit $SM_2$.

The output currents of the current mirror circuits $SM_1$ and $SM_2$ produce an output current $I_A/K+I_B/K+I'_A/K+I'_B/K$ in the output branch of the current mirror circuit $M_4$ and an output current $I'_A/K+I'_B/K$ in the output branch of the current mirror circuit $M_5$. As can be readily seen, an output current of value:

$$I_{U1} = I'_A/K + I'_B/K - I_A/K - I_B/K \qquad (1)$$

and an output current of value:

$$I_{U2} = I_B/K - I_A/K + I'_B/K - I'_A/K \qquad (2)$$

are respectively available at the first and second output terminals $U_1$ and $U_2$, having attributed a conventional output direction to both output currents for these relationships, as shown in FIG. 1.

It is now supposed that a measurement circuit of the invention is coupled by its input terminals to a two-wire transmission line, in particular, to a subscriber's telephone line.

Since the input branch of the current mirror circuit $M_1$ and the first input branch of the current mirror circuit $SM_2$ are coupled to a same wire of the line, and the input branch of the current mirror circuit $M_2$ and the first input branch of the current mirror circuit $SM_1$ are coupled to the other wire, it is immediately possible to calculate the values of the output currents at the terminals $U_1$ and $U_2$ determined by the longitudinal and transverse currents in the line, on the basis of the above relationships (1) and (2), under any line conditions.

In the case in which the longitudinal common mode currents $I_{CM}$ have an intensity which is lower than that of the transverse line current $I_L$, the overall currents in the line have an opposite direction in the two wires, since by applying the relationships (1) and (2), it is only necessary to consider input currents $I_A$ and $I_B$ for a specific line polarity and input currents $I'_A$ and $I'_B$ for the opposite polarity. This produces at the first and second output terminals $U_1$ and $U_2$ respectively, an input current:

$$I_{U1}=[I_A+I_B]/K=2I_L/K$$

and an input current:

$$I_U=[I_A-I_B]/K=2I_{CM}/K$$

or, for an opposite line polarity, an output current:

$$I'_U=[I'_A+I'_B]/K$$

and an input current:

$$I'U=[I'_A-I'_B]/K=2I_{CM}/K$$

directions given for these output currents $I_{U1}, I'_{U1}, I_{U2}$ and $I'_{U2}$ being determined on the basis of the electrotechnical conventions already applied to the currents to which relationships (1) and (2) refer.

As regards the current adding operation, which provides a measurement of the line current $I_L$, it should be noted that a circuit of the invention not only guarantees this measurement, but also provides information on the polarity of the line via the direction of the output current at the terminal $U_1$ which is in fact different for $I_{U1}$ and $I'_{U1}$.

As regards the current subtraction operation, however, which provides a measurement of the common mode currents $I_{CM}$, the circuit also supplies information on the direction of these currents in the line, irrespective of the polarity of the line itself. In effect, the currents $I_{U2}$ and $I'_{U2}$ are conventionally produced as input when the intensity of the current $I_A$ is greater than that of the current $I_B$ and when the intensity of the current $I'_A$ is greater than that of the current $I'_B$ respectively, i.e., when, in the two cases of polarity of the line, the common mode currents $I_{CM}$ present in the line have the same direction, i.e., are output with respect to the measurement circuit.

The direction of the currents $I_{U2}$ and $I'_{U2}$ is, however, opposite, i.e., conventionally as output, when the intensity of the current $I_B$ is greater than that of the current $I_A$ and the intensity of the current $I'_B$ is greater than that of the current $I'_A$, i.e. when, in the two cases of polarity of the line, the common mode currents have the same direction, i.e. are input with respect to the circuit.

In the case in which the longitudinal common mode currents $I_{CM}$ have a higher intensity than that of the transverse line current $I_L$, the overall currents in the line have the same direction in the two wires, therefore by using relationships (1) and (2) to calculate the measurement currents, it is only necessary to consider input currents in an output direction $I_A$ and $I'_A$ or in an input direction $I_B$ and $I'_B$, in accordance with the direction of the common mode currents in the line.

This provides an input current $I_U=I_A/K-I'_A/K$
and an input current $I_U=I_A/K+I'_A/K$
or an input current $I^*_{U1}=I_B/K-I'_B/K$
and an output current $I^*_{U2}=I_B/K+I'_B/K$
as output at the first and second terminals $U_1$ and $U_2$ respectively, in accordance with the normal conventions for the directions of the currents.

It can readily be shown that in this case as well a measurement of the transverse line current $I_L$ and a measurement of the common mode currents $I_{CM}$ are obtained at the first and second output terminals $U_1$ and $U_2$ respectively.

As, in effect, the intensity of the common mode currents is greater than that of the transverse current, the following is true:

$$|I_{CM}|=|I_L|+|I_D|$$

in which $I_D$ is a "subtraction" current.

Considering, for example, the polarity of the line in which the direction of the transverse current in the wire to which the current mirror circuit $M_1$ is coupled, is identical to that of the common mode currents, the following is obtained with reference to the case of input currents in an output direction $I_A$ and $I'_A$ (the case of the input currents $I_B$ and $I'_B$ being completely identical):

$$I_A=2I_L+I_D$$

$$I'_A=I_D$$

The following result is therefore obtained:

$$I_{U1}=[I_A-I'_A]/K=2I/K$$

$$I_{U2}=[I_A+I'_A]/K=2(I_L+I_D)/K=2I_{CM}/K$$

As can be seen, in this case as well, the same information relating to the polarity of the line and the same information relating to the direction in the line of the longitudinal common mode currents is maintained, via the direction of the current available at the output terminal $U_1$ and the direction of the current available at the output terminal $U_2$ respectively.

A measurement circuit in accordance with the present invention may be constructed by means of any of the techniques of implementation and monolithic integration known to persons skilled in the art.

Although a single embodiment of the invention has been described and illustrated, it is evident that a number of variants are possible without departing from the scope of the invention.

We claim:

1. A monolithically integratable measuring circuit for measuring longitudinal and transverse currents in a two-wire transmission line comprising: first and second current mirror circuits of a first type each having at least one input branch and at least a first and a second output branch; third, fourth and fifth current mirror circuits each having at least one input branch and at least one output branch; and first and second current mirror circuits of a second type each having at least a first and a second input branch and at least a first and a second output branch; wherein: said input branch of said first current mirror circuit of the first type and said first input branch of said second current mirror circuit of the second type respectively form a first and a second input terminal of the measuring circuit for coupling to a first wire of the two-wire transmission line; said input branch of said second current mirror circuit of the first type and said first input branch of said first current mirror circuit of the second type respectively form a third and a fourth input terminal of the measuring circuit for coupling to a second wire of the two-wire transmission line; said first and third terminals forming input terminals for currents having a first direction and said second and fourth terminals forming input terminals for currents having a second direction which is opposite to that of the first direction; the currents flowing in said first and second output branches in each of said first and second current mirror circuits of the first type being proportional to the current flowing in their respective input branch in accordance with a first and a second constant factor of proportionality respectively, the second constant factor of proportionality having a value which is double the value of the first constant factor; and wherein the current flowing in said output branch in each of said third, fourth and fifth current mirror circuits is identical to the current flowing in their respective input branch; and wherein the currents flowing in said first and second output branches of each of said first and second current mirror circuits of the second type are equal to the sum of the current flowing in their respective second input branch and the current flowing in their respective first input branch multiplied by the first constant factor; and wherein said first output branch of said first current mirror circuit of the first type and said first output branch of said second current mirror circuit of said first type are respectively connected to said second input branch of said first current mirror circuit of said second type and said second input branch of said second current mirror circuit of said second type and said second output branch of said first current mirror circuit of said first type and said second output branch of said second current mirror circuit of said first type are both connected to said input branch of said third current mirror circuit; and wherein said second output branch of said first current mirror circuit of said second type and said second output branch of said second current mirror circuit of said second type are both connected to said input branch of said fourth current mirror circuit and said first output branch of said second current mirror circuit of said second type is connected to said input branch of said fifth current mirror circuit; and wherein said first output branch of said first current mirror circuit of said second type and said output branch of said fifth current mirror circuit are connected together to form a first output terminal of the measuring circuit and said output branch of said third current mirror circuit and said output branch of said fourth current mirror circuit are connected together to form a second output terminal of the measuring circuit.

2. A monolithically integratable circuit for receiving a plurality of external input currents and for outputting at least two output currents, said circuit comprising:
a means for receiving an input current $I_A$;
a means for receiving an input current $I'_A$;
a means for receiving an input current $I_B$;
a means for receiving an input current $I'_B$;
a means for outputting a current $I_{U1}$ having a value in accordance with the equation:

$$I_{U1} = \frac{I'_A}{K} + \frac{I'_B}{K} - \frac{I_A}{K} - \frac{I_B}{K}$$

and a means for outputting a current $I_{U2}$ in accordance with the equation:

$$I_{U2} = \frac{I_B}{K} - \frac{I_A}{K} + \frac{I'_B}{K} - \frac{I'_A}{K};$$

wherein said means for receiving said input current $I_A$ comprises a first current mirror of a first type which receives said current $I_A$ and which has a first output for outputting a current equal to $I_A/K$ and having a second output for outputting a current $2I_A/K$;
a second current mirror of said first type having an input for receiving said current $I'_A$ and having a first output for outputting a current $I'_A/K$ and having a second output for outputting a currect $2I'_A/K$;
a third current mirror of said first type having an input connected to said second outputs of said first and second current mirrors of said first type for receiving said output currents therefrom and having an output for outputting a current equal to the sum of said currents output by said second outputs of said first and second current mirrors of said first type;
a first current mirror of a second type having a first input for receiving said current $I'_B$ and having a second input connected to said first output of said second current mirror of said first type for receiving said current output therefrom and having first output for outputting a current equal to the sum of the currents received by said first and second inputs divided by K and having a second output for outputting a current equal to the sum of said currents received by said first and second inputs divided by K;
a second current mirror of said second type having a first input for receiving said current $I_B$ and having a second input connected to said first output of said first current mirror of said first type for receiving said current output therefrom and having a first output for outputting a current equal to the sum of the currents received by said first and second inputs divided by K and having a second output for outputting a current equal to the sum of the currents received by said first and second inputs;
a current mirror having an input connected to said first output of said first current mirror of said second type and having an output connected to said first output of said second current mirror of said second type and an output $U_1$.

a current mirror having an input connected to said second outputs of said first and second current mirrors of said second type for receiving said currents output therefrom and having an output connected to said output of said third current mirror of said first type and to an output terminal $U_2$.

* * * * *